(12) United States Patent
Chen et al.

(10) Patent No.: US 11,125,407 B1
(45) Date of Patent: Sep. 21, 2021

(54) VEHICLE LAMP ASSEMBLY

(71) Applicant: Ford Global Technologies, LLC, Dearborn, MI (US)

(72) Inventors: Linsheng Chen, Novi, MI (US); Robert William Miller, Inkster, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/814,238

(22) Filed: Mar. 10, 2020

(51) Int. Cl.
- *F21S 41/25* (2018.01)
- *G02B 3/08* (2006.01)
- *G02B 27/30* (2006.01)
- *F21S 41/20* (2018.01)

(52) U.S. Cl.
CPC ............ *F21S 41/25* (2018.01); *F21S 41/28* (2018.01); *G02B 3/08* (2013.01); *G02B 27/30* (2013.01)

(58) Field of Classification Search
CPC .......... F21S 41/25; G02B 3/08; F21V 7/0091
See application file for complete search history.

(56) References Cited

U.S. PATENT DOCUMENTS

| | | | |
|---|---|---|---|
| 6,352,359 B1 | 3/2002 | Shie et al. | |
| 10,308,174 B2 | 6/2019 | Chen | |
| 10,443,813 B2 * | 10/2019 | Wondergem-De Best | F21V 7/0091 |
| 2005/0024887 A1 | 2/2005 | Boxler | |
| 2008/0310028 A1 * | 12/2008 | Chinniah | F21V 7/0091 359/642 |
| 2011/0267823 A1 * | 11/2011 | Angelini | F21V 14/065 362/277 |
| 2012/0250330 A1 * | 10/2012 | Kelly | G02B 19/0061 362/308 |
| 2014/0072268 A1 * | 3/2014 | Gill | G02B 6/124 385/129 |
| 2015/0062917 A1 * | 3/2015 | Yin | F21V 5/045 362/309 |
| 2015/0276168 A1 * | 10/2015 | Malkmus | G02B 3/08 362/235 |
| 2015/0371070 A1 * | 12/2015 | Shi | H04N 1/02825 235/462.42 |
| 2017/0184276 A1 * | 6/2017 | Wang | G02B 19/0028 |
| 2018/0326666 A1 | 11/2018 | Kelly et al. | |
| 2020/0256534 A1 * | 8/2020 | Ikuta | F21S 41/143 |

FOREIGN PATENT DOCUMENTS

EP 2635843 B1 12/2014

OTHER PUBLICATIONS

Luxexcel Technology, 3D Printed Optics, http://blog.luxexcel.com.

* cited by examiner

*Primary Examiner* — Jong-Suk (James) Lee
*Assistant Examiner* — Christopher E Dunay
(74) *Attorney, Agent, or Firm* — David Coppiellie; Price Heneveld LLP

(57) ABSTRACT

A vehicle lamp assembly includes a housing that defines an opening. A light source is operably coupled with the housing. The light source is configured to emit light. A lens is coupled to the housing proximate the opening. The lens includes a first side that has an A-surface of the lens. A second side has a B-surface of the lens. A first optic defines an interior surface of the first side of the lens. The A-surface is free of the first optic. A second optic is defined on the second side. The first optic and the second optic are aligned to collimate and disperse the light.

17 Claims, 9 Drawing Sheets

VEHICLE LAMP ASSEMBLY

FIELD OF THE DISCLOSURE

The present disclosure generally relates to a lamp assembly. More specifically, the present disclosure relates to a lamp assembly for a vehicle.

BACKGROUND OF THE DISCLOSURE

Vehicles typically have lights on an exterior of the vehicle, as well as within an interior of the vehicle. The lights often illuminate for various functions.

SUMMARY OF THE DISCLOSURE

According to at least one aspect of the present disclosure, a vehicle lamp assembly includes a housing that defines an opening. A light source is operably coupled with the housing. The light source is configured to emit light. A lens is coupled to the housing proximate the opening. The lens includes a first side that has an A-surface of the lens. A second side has a B-surface of the lens. A first optic defines an interior surface of the first side of the lens. The A-surface is free of the first optic. A second optic is defined on the second side. The first optic and the second optic are aligned to collimate and disperse the light.

According to another aspect of the present disclosure, a lamp assembly for a vehicle includes a cover. A lens is coupled to the cover. The lens includes a first surface and a second surface. The first surface and the second surface define an interior of the lens. A first optic is defined within the interior of the lens. A second optic is defined in at least one of the interior of the lens and the second surface.

According to another aspect of the present disclosure, a method for manufacturing a lens for a vehicle lamp assembly includes forming a lens that defines a cavity in an interior thereof. A support feature is added within the cavity of the lens. An optic is printed in the interior of the lens adjacent to the cavity. A support feature is heated. The support feature is removed through apertures defined in the lens. The apertures are in fluid communication with the cavity.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
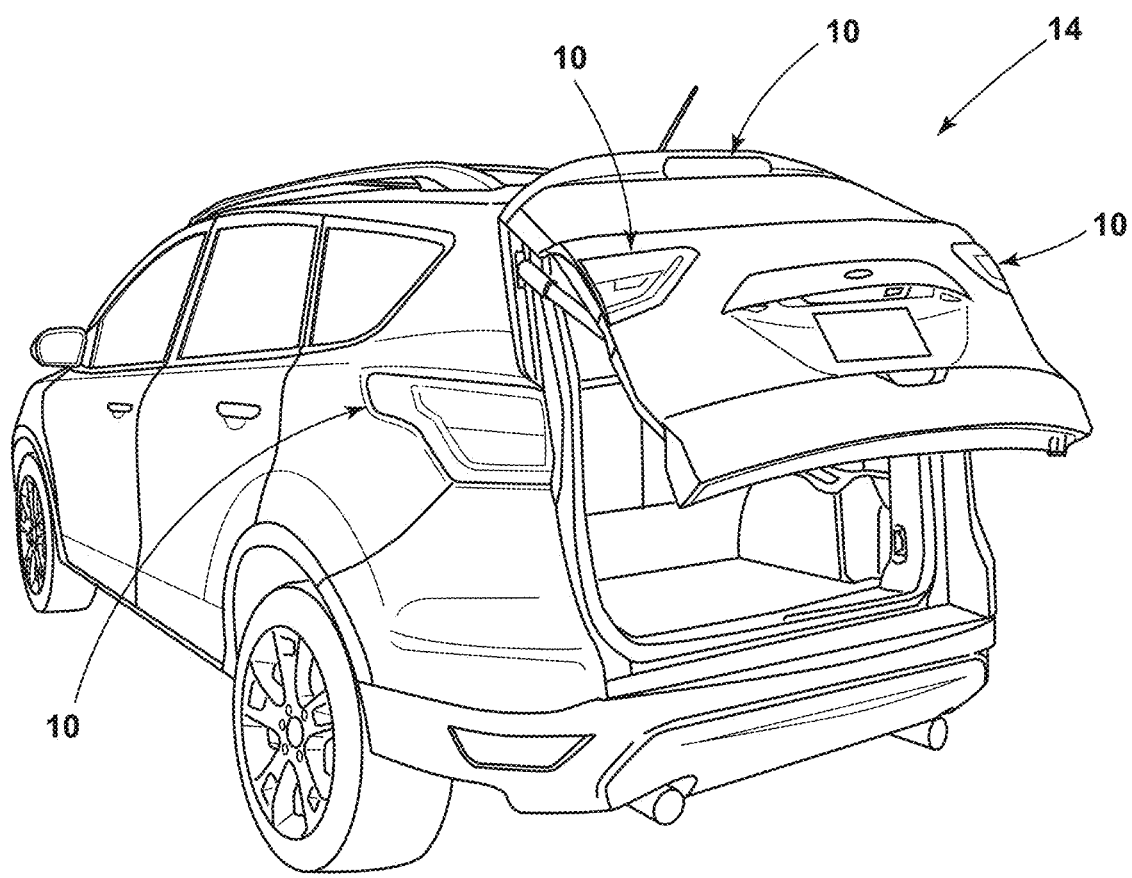
FIG. 1 is a side perspective view of a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-11, reference numeral 10 generally refers to a lamp assembly for a vehicle 14 that includes a housing 18 that defines an opening 22. A light source 26 is operably coupled with the housing 18. The light source 26 is configured to emit light. A lens 30 is coupled to the housing 18 proximate the opening 22. The lens 30 includes a first side 34 that has an A-surface 38 of the lens 30 and a second side 42 that has a B-surface 46 of the lens 30. A first optic 50 is defined on an interior surface 54 of the first side 34 of the lens 30. The A-surface 38 is free of the first optic 50. A second optic 58 is defined on the second side 42. The first optic 50 and the second optic 58 are aligned to collimate and disperse the light.

Referring to FIG. 1, the vehicle 14 can be any type of vehicle 14, such as, for example, a sedan, a truck, a van, a crossover, a sport utility vehicle, or another style vehicle 14. The vehicle 14 may be a manually operated vehicle 14 (e.g., with a human driver), a fully autonomous vehicle 14 (e.g., no human driver), or a partially autonomous vehicle 14 (e.g., may be operated with or without a human driver). Additionally, the vehicle 14 may be utilized for personal and/or commercial purposes, such as, for ride-providing services (e.g., chauffeuring) and/or ride-sharing services.

Figure 2:
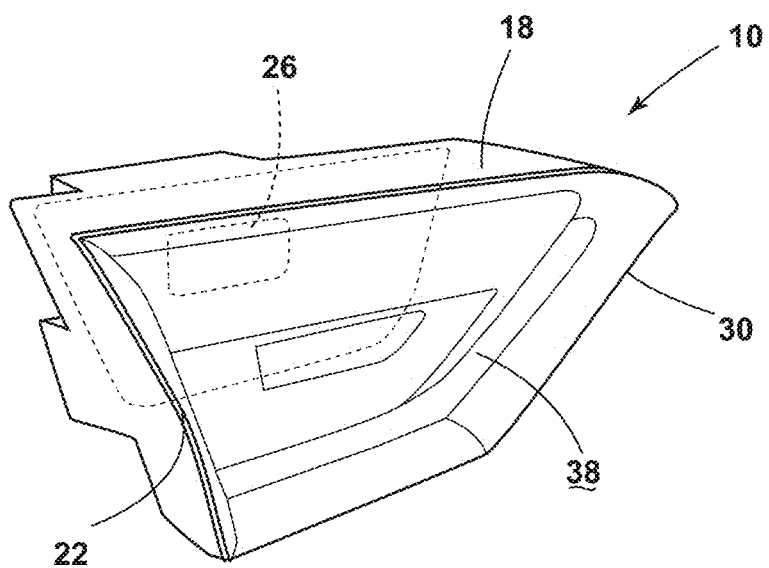
FIG. 2 is a side perspective view of a vehicle lamp assembly, according to one example.

Referring to FIGS. 1 and 2, the lamp assembly 10 can be, for example, a liftgate light, a taillight, a headlight, a truck bed light, any other exterior vehicle light, and/or a combination thereof. Additionally or alternatively, the lamp assembly 10 may be an interior vehicle light. The housing 18 of the lamp assembly 10 may be configured to couple with the vehicle 14. The housing 18 may be any practicable shape and/or size to couple the lens 30 to the vehicle 14. Further, the housing 18 may be constructed of any practicable material that can withstand changes in temperature and other weather conditions that may affect the exterior of the vehicle 14.

The housing 18 may define the opening 22, and the lens 30 can be coupled to the housing 18 proximate the opening 22. In certain aspects, the lens 30 may substantially, or entirely, fill the opening 22. The light source 26 may be disposed within the housing 18, or alternatively, may be coupled to the vehicle 14 proximate the housing 18. The light source 26 may be disposed to emit light through the lens 30.

The light source 26 may be configured as a single light source or more than one light source disposed in a pattern. When configured as more than one light source, each light source 26 may be selectively and/or independently controlled, such that one, all, or a portion of the light sources can be activated at any given time. The light source 26 may be configured to emit visible light having a wavelength in a range of from about 380 nm to about 740 nm. The second light source 26 may include any form of light source. For example, fluorescent lighting, light-emitting diodes, LEDs, organic LEDs (OLEDs), polymer LEDs (PLEDs), laser diodes, quantum dot LEDs (QD-LEDs), solid-state lighting, hybrid and/or any other similar device. Any other form of lighting may be utilized within the lamp assembly 10 without departing from the teachings herein. Further, various types of LEDs are suitable for use as the light source 26, including, but not limited to, top-emitting LEDs, side-emitting LEDs, and others. Moreover, multicolored light sources such as Red, Green, and Blue (RGB) LEDs that may employ red, green, and blue LED packaging, which may be used to generate various desired colors of light output from a single light source, according to known light color mixing techniques.

The light source 26 may be disposed on one or more circuits. The circuits may be configured as a printed circuit board. In such examples, the printed circuit board may be a flexible or rigid printed circuit board. Additionally, the light source 26 may be operably coupled with a controller. The controller can include a processor, a memory, and other control circuitry, such as light drive circuitry. Routines can be stored in the memory and executed by the processor. The routines can relate to controlling the light source 26.

Figure 3:
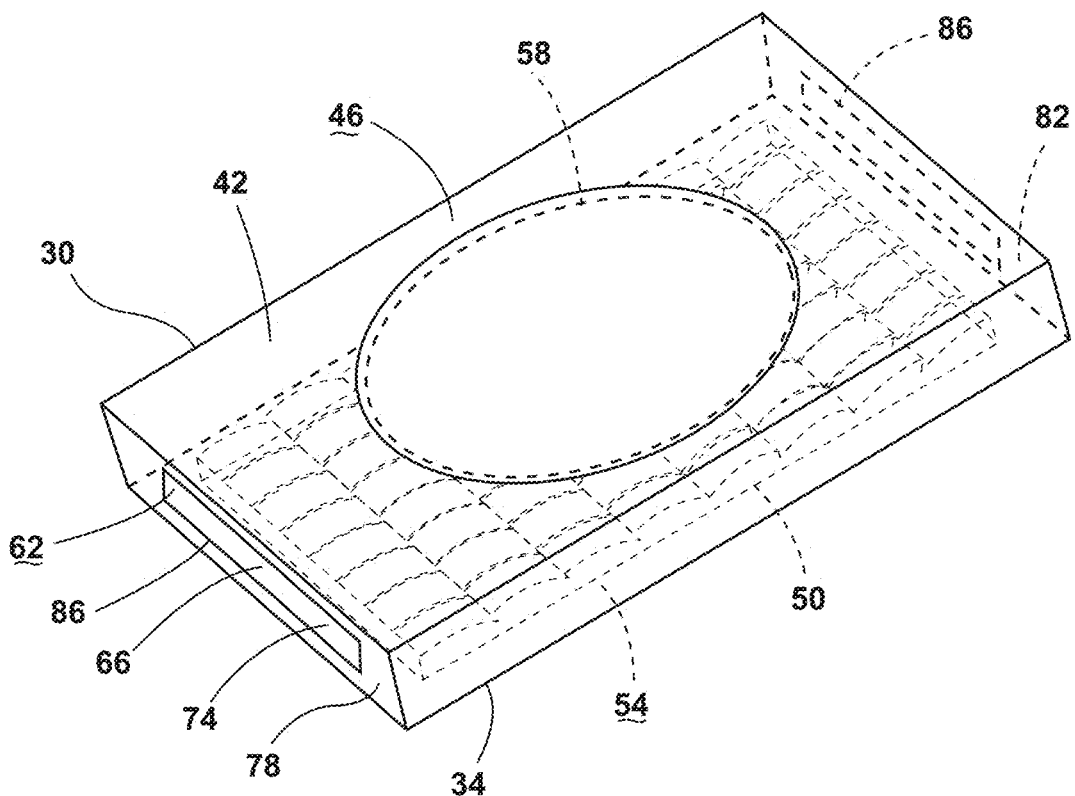
FIG. 3 is a bottom perspective view of a lens for a vehicle lamp assembly, according to one example.
Figure 4:
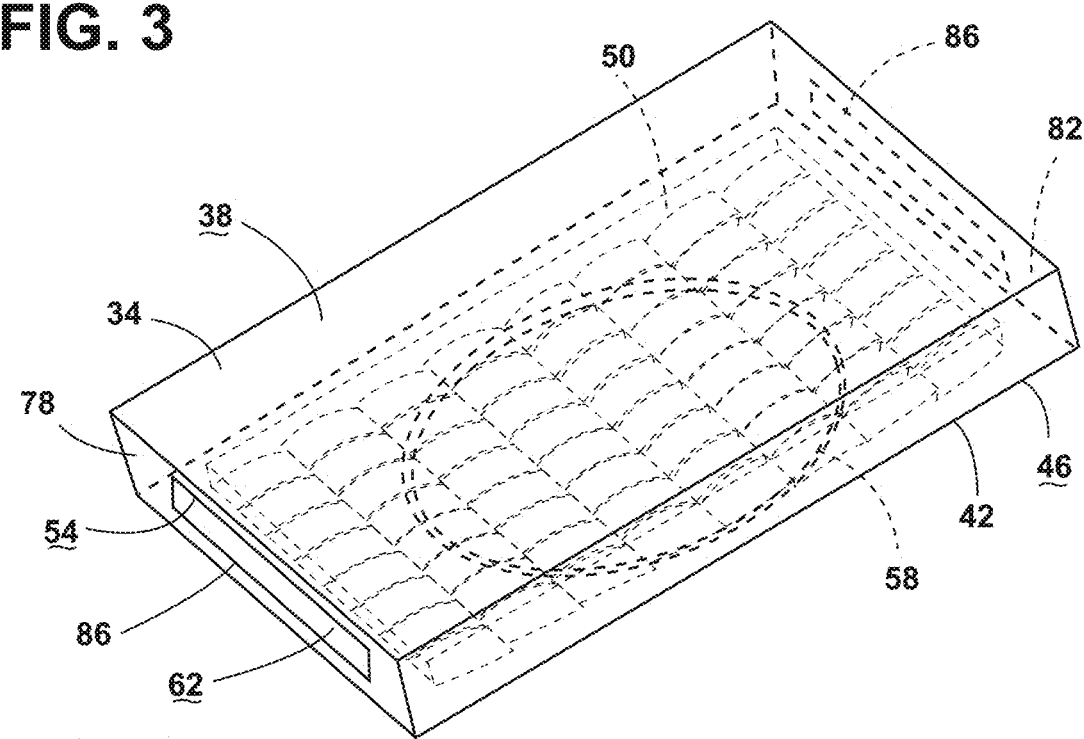
FIG. 4 is a top perspective view of the lens of FIG. 3.

Referring to FIGS. 3 and 4, the lens 30 includes the first side 34 that has the interior surface 54 and an outer surface, which may be the A-surface 38 of the lens 30. The second side 42 of the lens 30 includes an inner surface 62 and an outer surface, which can be the B-surface 46 of the lens 30. The interior surface 54 of the first side 34 and the inner surface 62 of the second side 42 may be oriented toward one another. As used herein, the term "A-surface" refers to a surface of any component within the vehicle 14 that is visible and/or contactable when the component is in an assembled state. Contrastingly, the term "B-surface" refers to a surface of any component within the vehicle 14 that is concealed and/or non-contactable when the component is in an assembled state.

The first side 34 of the lens 30 defines the first optic 50. In various examples, the first optic 50 may be defined by the interior surface 54, such that the A-surface 38 is free of the first optic 50. In such configurations, the A-surface 38 is substantially flat or smooth. The flat or smooth A-surface 38 of the lens 30 may have some degree of curvature or deformation caused by the shape of the lens 30 and/or the lamp assembly 10 (FIG. 2) without departing from the teachings herein.

As illustrated, the first optic 50 extends across the interior surface 54 of the first side 34 of the lens 30. The first optic 50 may cover all, or a substantial portion, of the interior surface 54. Alternatively, the first optic 50 may be disposed in one or more discrete portions of the interior surface 54. As illustrated in FIGS. 3 and 4, the first optic 50 is configured as a pillow lens. The first optic 50 may be any type of optic or lens feature that is configured to disperse and/or redistribute light to different target areas within or proximate the vehicle 14. For example, the first optic 50 may be configured as a pillow lens, a fluted lens, other light redirecting lens features, and/or a combination thereof. In the illustrated example, each pillow optic (e.g., the first optic 50) may have a 1 mm×1 mm size, however, any shape and/or size of the first optic 50 may be utilized to provide the selected redistribution of light to the designated target areas.

Referring still to FIGS. 3 and 4, the second optic 58 may be defined on the second side 42 of the lens 30. In certain aspects, the second optic 58 is defined by the inner surface 62 of the second side 42 of the lens 30. In this way, the B-surface 46 of the lens 30 may be free of the second optic 58. Accordingly, the B-surface 46 may be substantially flat or smooth. Similar to the A-surface 38, the B-surface 46 may have a degree of curvature or deformation based on the configuration of the lens 30 and/or the lamp assembly 10 (FIG. 2) without departing from the teachings herein.

As illustrated, the second optic 58 may be defined in a discrete portion of the inner surface 62. It is contemplated that the second optic 58 may be disposed in more than one discrete portion and/or extend across a substantial portion of the inner surface 62 without departing from the teachings herein. The second optic 58 may be configured to collect and/or collimate light. For example, the second optic 58 may be a Fresnel lens, a near field lens, a total internal reflection (TIR) lens, other collimating lens features, and/or a combination thereof.

In the exemplary embodiment illustrated in FIGS. 3 and 4, the A-surface 38 and the B-surface 46 of the lens 30 are both substantially flat and/or smooth. Accordingly, the A-surface 38 is free of the first optic 50 and the B-surface 46 is free of the second optic 58. Each of the first optic 50 and the second optic 58 may be defined within an interior 66 of the lens 30. This configuration may be advantageous for providing the lens 30 with two optics (e.g., the first optic 50 and the second optic 58) within the lens 30, while having outer surfaces (e.g., the A-surface 38 and the B-surface 46) that are flat or smooth. Having a flat or smooth A-surface 38 and B-surface 46 may be advantageous for preventing dirt, pollen, or other environmental conditions from being retained on the lens 30.

Figure 5:
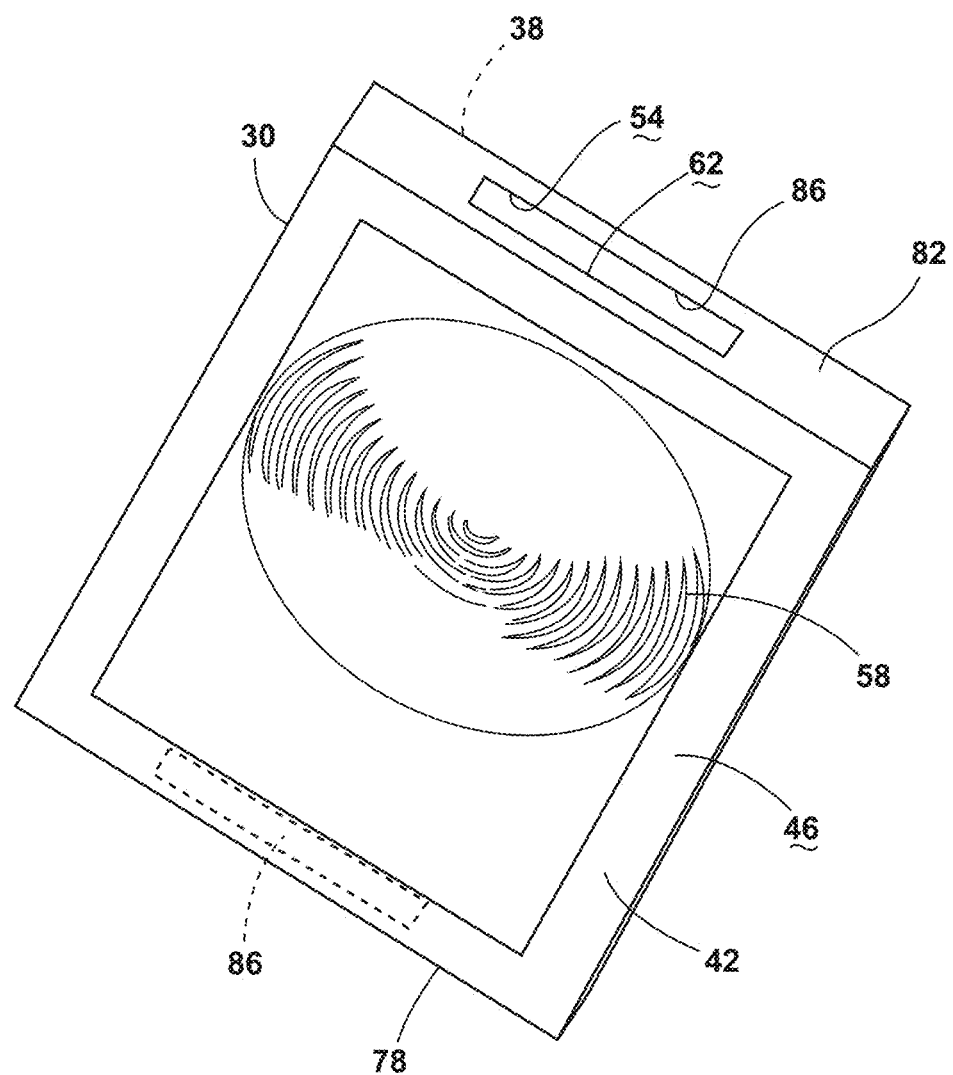
FIG. 5 is a bottom perspective view of a lens for a vehicle lamp assembly, according to one example.

Referring to FIG. 5, an additional or alternative example of the lens 30 is illustrated. The second optic 58 may be defined by the B-surface 46. The second optic 58 may be substantially similar to the exemplary embodiments illustrated in FIGS. 3 and 4; however, the second optic 58 may be defined in a different portion of the second side 42 of the lens 30. Accordingly, the A-surface 38 may be substantially flat or smooth, while the B-surface 46 of the lens 30 may define the second optic 58. In examples where the second optic 58 is defined in one or more discrete portions of the B-surface 46, the remaining portion or portions of the B-surface 46 may be substantially flat or smooth. The inner surface 62 may be free of the second optic 58 when the second optic 58 is defined by the B-surface 46. The lens 30 can provide two different optics aligned with one another with a substantially smooth or flat A-surface 38.

Figure 6:
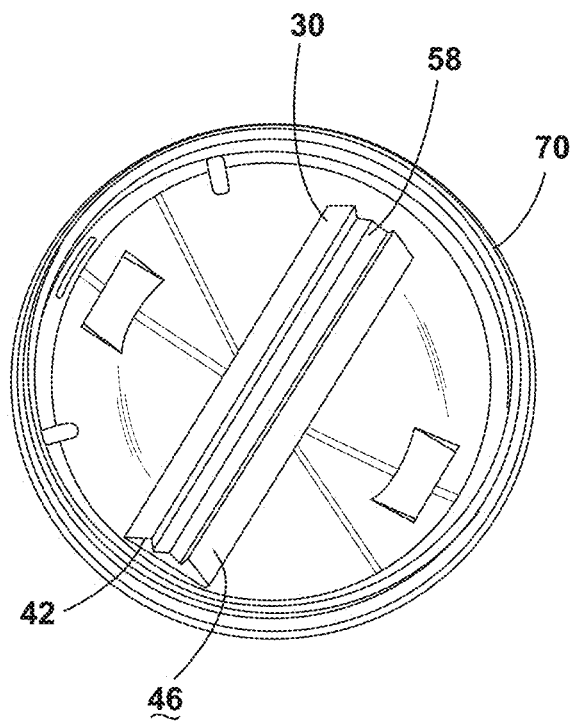
FIG. 6 is a bottom perspective view of a lens for a vehicle lamp assembly, according to one example.
Figure 7:
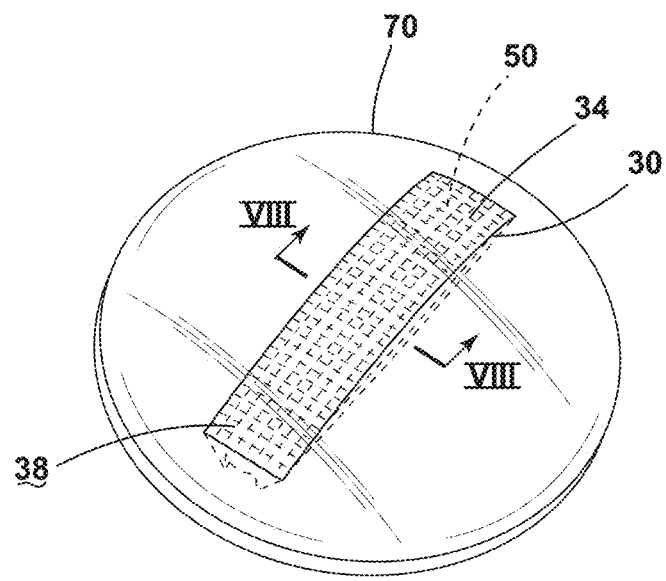
FIG. 7 is a top perspective view of the lens of FIG. 6.
Figure 8:
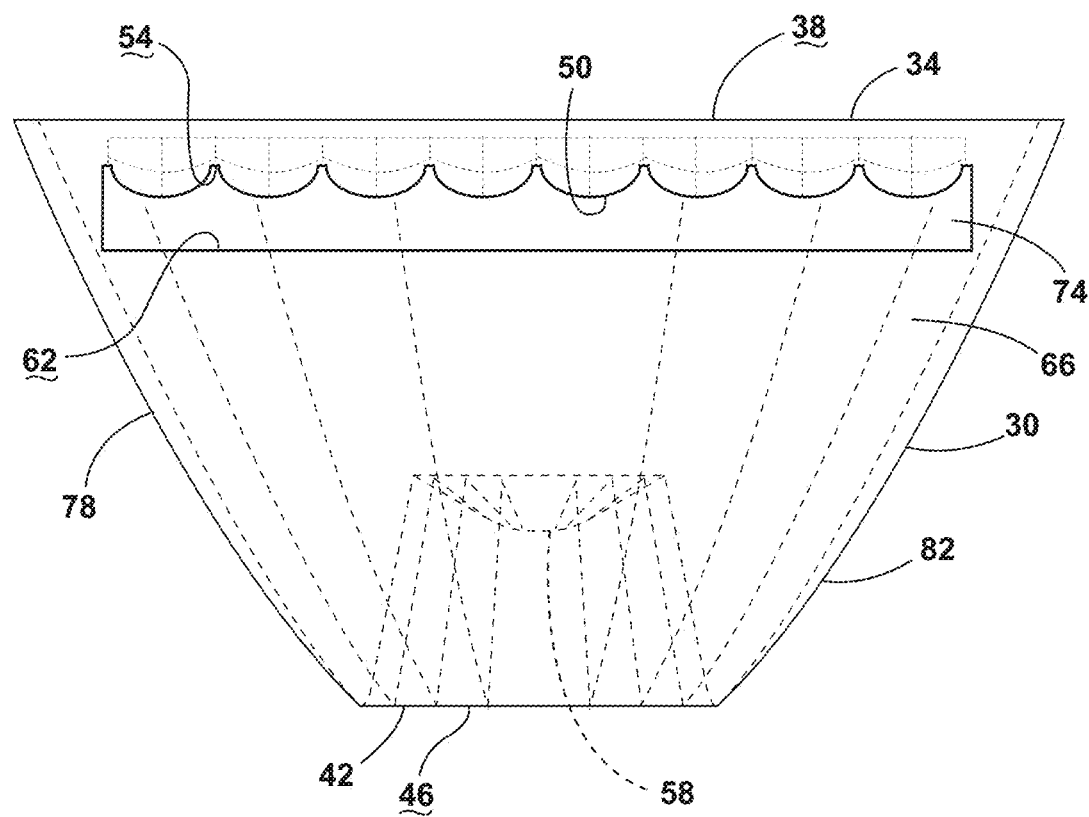
FIG. 8 is a cross-sectional view of the lens of FIG. 7, taken along line VIII-VIII.

Referring to FIGS. 6-8, an additional or alternative example of the lens 30 is illustrated. In the illustrated example, the first optic 50 is defined by the interior surface 54 of the first side 34 of the lens 30, and the second optic 58 is defined by the B-surface 46 of the lens 30. Accordingly, the A-surface 38 may be substantially flat or smooth. As illustrated, the first optic 50 is configured as a pillow lens, and the second optic 58 is configured as a TIR lens. However, the first optic 50 may be any configuration that redistributes light, and the second optic 58 may be any configuration that collects and/or collimates light.

Referring to FIGS. 2 and 6-8, in various examples, the lens 30 may be coupled to a cover 70, and the cover 70 may be coupled to the housing 18 proximate the opening 22. The lens 30 may be positioned on or within the cover 70 and be aligned with the light source 26 to collimate and redistribute the light emitted from the light source 26. The lens 30 may be a separate component coupled to the cover 70, or alternatively, may be integrally formed with the cover 70. The lens 30 may be a portion of the cover 70, such as the central portion as illustrated in FIGS. 6 and 7. The lens 30 may form any practicable portion of the cover 70. The remaining portions of the cover 70 may not include the first and/or second optics 50, 58. The cover 70 may be coupled to the vehicle 14 (FIG. 1), the housing 18, an additional support structure of the lamp assembly 10, and/or a combination thereof. It is contemplated, that the lamp assembly 10 may not include a separate cover 70, such that the lens 30 operates as the cover 70 and substantially fills the opening 22 of the housing 18. In such examples, the first and/or second optics 50, 58 may extend across a substantial portion of the opening 22.

Referring to FIG. 8, the lens 30 defines a channel or cavity 74 in the interior 66 thereof. The first side 34 and the second side 42 define the cavity 74 therebetween. The cavity 74 may extend the length of the lens 30. Accordingly, the interior 66 of the lens 30 may be at least partially hollow. The cavity 74, as illustrated in FIG. 8, may be disposed closer to the A-surface 38 than the B-surface 46. It is contemplated that the cavity 74 may be any practicable shape and/or size and may be in any practicable location of the lens 30 without departing from the teachings herein.

The lens 30 may include opposing connecting walls 78, 82 extending between the first and second sides 34, 42. The cavity 74 may extend from proximate the first connecting wall 78 to proximate the second connecting wall 82. Accordingly, in at least some locations of the cavity 74, the cavity 74 may not extend entirely through the lens 30 but may be enclosed by the connecting walls 78, 82. The cavity 74 can extend a substantial portion of the width of the lens 30.

In various examples, the interior surface 54 of the first side 34 and the inner surface 62 of the second side 42 may be cavity surfaces. The first optic 50 may be defined in the cavity 74. As illustrated in FIG. 8, the first optic 50 is defined in the interior surface 54 of the first side 34 and produces a patterned surface (e.g., not smooth and/or flat) within the cavity 74. The space provided by the cavity 74 may allow the first optic 50 to be defined within the interior 66 of the lens 30, which may produce the selected lighting effects, while the A-surface 38 remains smooth and/or flat.

As illustrated in FIG. 8, the second optic 58 is defined in the B-surface 46 of the lens 30. Accordingly, the inner surface 62 of the second side 42 (e.g., opposing the interior surface 54 of the first side 34) is substantially flat or smooth, such that the inner surface 62 may not substantially affect the emitted light traveling through the lens 30.

Figure 9:
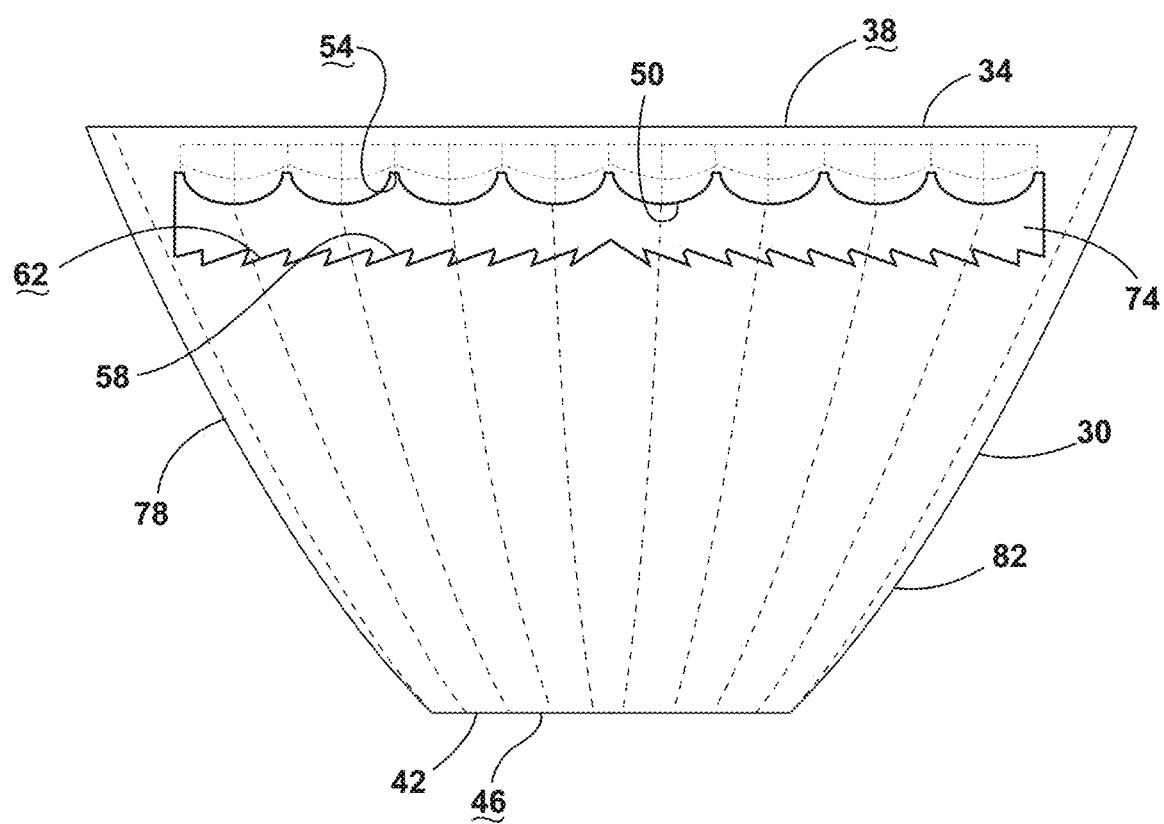
FIG. 9 is a cross-sectional view of a lens of a vehicle lamp assembly, according to one example.

Referring to FIG. 9, the second optic 58 may be defined in the inner surface 62. When the second optic 58 is defined and the inner surface 62 within the interior 66 of the lens 30, the B-surface 46 may be substantially flat or smooth. In such examples, the second optic 58 may produce a second patterned surface within the cavity 74. The first optic 50 and the second optic 58 may be disposed on opposing sides of the cavity 74. Accordingly, two separate patterned surfaces may be defined within the lens 30 to provide for two separate lighting effects.

Figure 10:
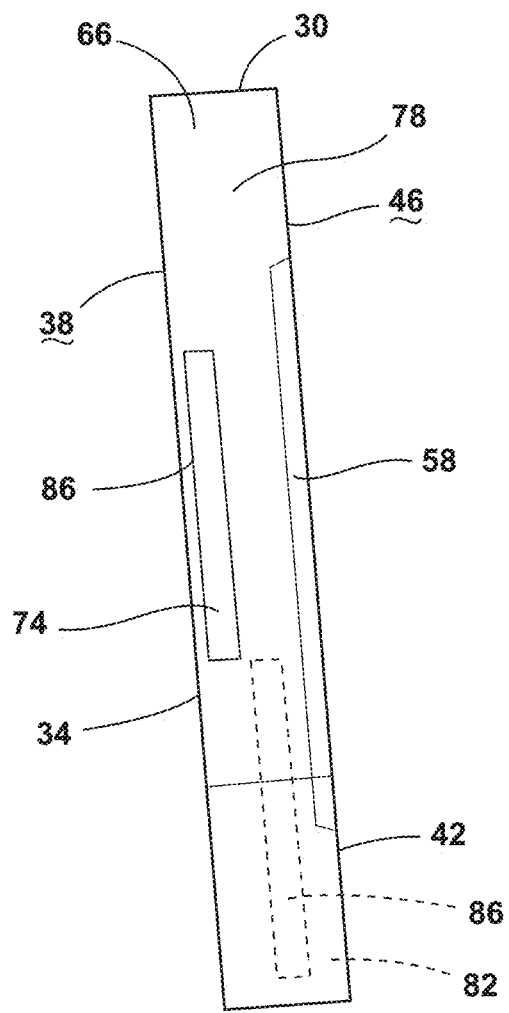
FIG. 10 is a side view of a lens of a vehicle lamp assembly, according to one example.

Referring to FIG. 10, each of the connecting walls 78, 82 may define an aperture 86. Each aperture 86 may be in fluid communication with the cavity 74 defined within the interior 66 of the lens 30. Accordingly, in at least some locations of the lens 30, the cavity 74 may extend through the connecting walls 78, 82. The apertures 86 may be offset from one another, as illustrated, or alternatively, may be aligned with one another. The apertures 86 may be defined in any practicable location of each of the connecting wall 78, 82.

Referring to FIGS. 1-10, the light source 26 is configured to emit light through the lens 30. The first optic 50 may be aligned with the second optic 58, such that the light emitted from the light source 26 may be directed through both the first optic 50 and the second optic 58. As the light is emitted, the second optic 58 may collect and/or collimate the light and direct the light to the first optic 50. The first optic 50 may redistribute and/or disperse the collimated light to a designated target area. Having at least the first optic 50 defined within the interior 66 of the lens 30 provides for a lamp assembly 10 having a flat or smooth A-surface 38. The flat or smooth A-surface 38 may be advantageous for preventing dirt, pollen, and/or other environmental conditions from being retained on the lens 30 due to the shape of any optics disposed thereon. Accordingly, the A-surface 38 may provide for a brighter, more even, and/or accurate illumination of the designated target areas. Accordingly, the first optic 50 and the second optic 58 may reshape and redistribute light from the light source 26 into different beam patterns. The different beam patterns can be produced with two optics in a single lens 30 while having at least a flat or smooth A-surface 38.

Figure 11:
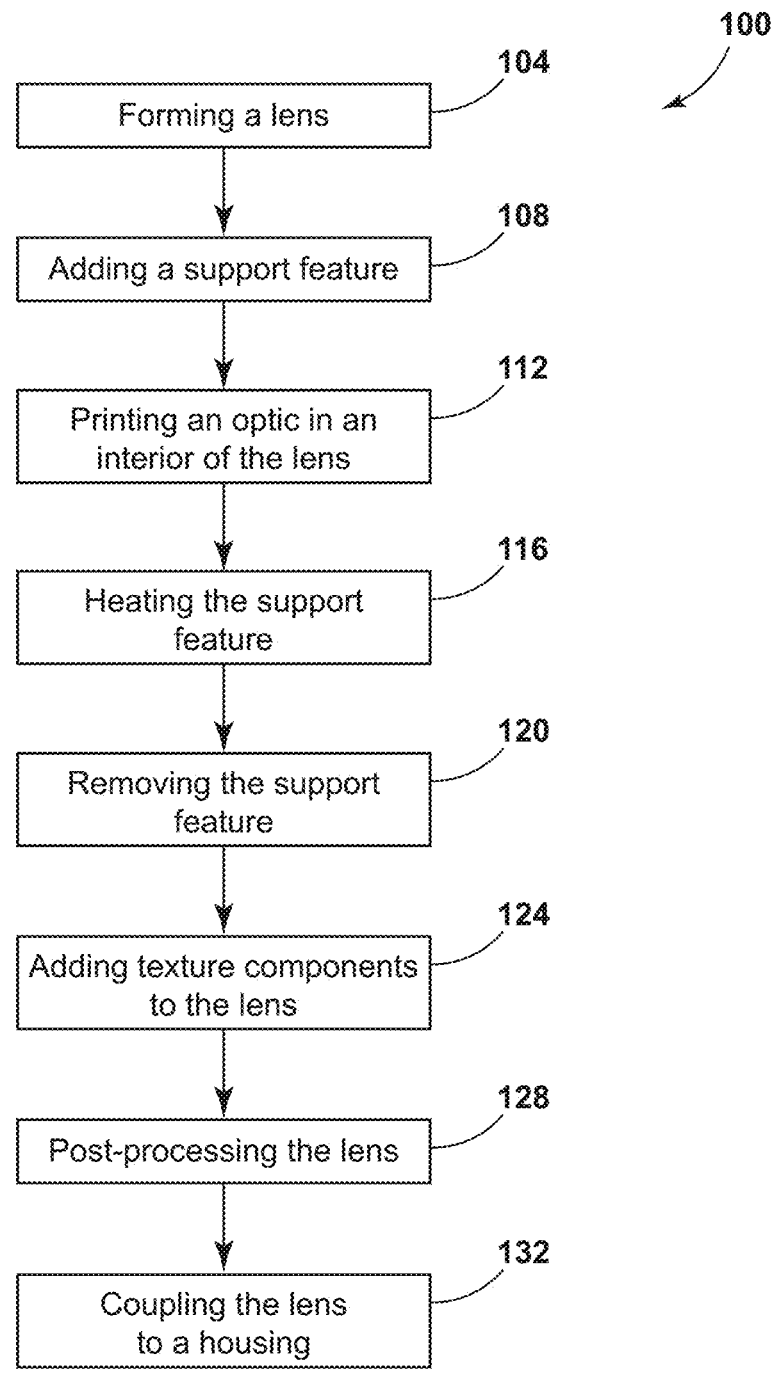
FIG. 11 is a flow diagram of a method of manufacturing a vehicle lamp assembly, according to one example.

Referring to FIG. 11, and with further reference to FIGS. 1-10, a method 100 of manufacturing the lamp assembly 10 includes step 104 of forming the lens 30. In certain aspects, the lens 30 may be at least partially extruded. For example, when the second optic 58 is defined in the B-surface 46 of the lens 30, the second optic 58 may be extruded with the lens 30. Additionally or alternatively, the lens 30 may be printed through an additive manufacturing process. The lens 30 may be formed using any practicable additive manufacturing process, for example, but not limited to, extrusion additive manufacturing (e.g., fused filament fabrication), photopolymerization additive manufacturing (e.g., stereolithography or SLA), powder bed fusion additive manufacturing, material jetting additive manufacturing, binder jetting additive manufacturing, directed energy deposition additive manufacturing, lamination, additive manufacturing, and/or any combination thereof. The additive manufacturing process may be advantageous for forming the first optic 50 and/or the second optic 58 within the interior 66 of the lens 30.

Generally, in additive manufacturing processes, digital three-dimensional design data is used to build components in layers by depositing materials on a build platform. The material within the layers and the material of the separate layers may be bonded or fused together through the use of laser beams directed at points indicated by the computer-generated design data. Layers are added on top of one another and fused to bond with the previous layers at predefined points.

In a non-limiting example, the lens 30 may be formed using the SLA additive manufacturing process. In such examples, a build platform is positioned within a tank of liquid polymer. An ultraviolet light may create a layer on the build platform by selectively curing and solidifying the photopolymer resin. A laser beam is focused in a predetermined path using a set of mirrors. The whole cross-sectional area of the model is scanned, so the produced part is fully solid. A sweeper blade can recoat the surface. The process may then repeat until the part is complete. The SLA additive manufacturing process may use post-processing under ultraviolet light for high mechanical and thermal properties. The liquid resin may be solidified through a photopolymerization process. During solidification, monomer carbon chains within the liquid resin may be activated by the ultraviolet light to become solid. The photopolymerization process may be irreversible, such that the SLA parts may remain in solid form when heated. Accordingly, materials produced using SLA may be constructed of thermoset polymers. For example, the polymer resin may include photosensitive thermoset polymers that come in liquid form. Through the SLA additive manufacturing process, the lens 30 may be formed by selectively curing a polymer resin layer-by-layer using an ultraviolet laser beam.

Referring still to FIG. 11, and with further reference to FIGS. 1-10, in another non-limiting example, the lens 30 may be formed using material jetting additive manufacturing processes. In such examples, a printhead may dispense droplets of photosensitive material on a build platform. The droplets of material are jetted or deposited in the selected locations. The materials are generally thermoset photopolymers (e.g., acrylics) that come in liquid form. The liquid resin may be heated to a viscosity advantageous for printing. An ultraviolet light may be attached to the printhead, which may be used to solidify the liquid material through the photopolymerization process, similar to the SLA additive manufacturing process. Material jetting may be advantageous for multi-material printing. Additionally, material jetting may provide a smoother finish to the final product relative to the SLA manufacturing process. With material jetting, the resolution of printed features can be about 10 microns.

In step 108, a support feature may be added to the lens 30 to assist in defining the cavity 74. The support feature may be added to the interior 66 of the lens 30 during the formation of the lens 30. The support feature may be a dissolvable material. Accordingly, the dissolvable support feature may have a different solubility than the material of the lens 30.

In step 112, the first optic 50 and/or the second optic 58 may be printed on the lens 30. The first optic 50 may be printed on the interior surface 54 proximate the cavity 74. The second optic 58 may be printed on the inner surface 62 on an opposing side of the cavity 74 relative to the first optic 50. The first optic 50 and/or the second optic 58 may be printed using the same additive manufacturing process as in step 104, or alternatively, using a different additive manufacturing process as in step 104. Additionally or alternatively, step 112 may include extruding the second optic 58 with the lens 30 when the second optic 58 is defined in the B-surface 46 of the lens 30. It is contemplated that step 112 may be performed substantially simultaneously with either or both of step 104 and step 108, or alternatively, each of step 104, step 108, and step 112 may be performed at separate times.

According to various aspects, step 104 and step 112 may be performed simultaneously and step 108 may be skipped. In such examples, the lens 30, including the first optic 50 and the second optic 58 may be formed using a volumetric fabrication process through the application of computed-tomography techniques in reverse. In such examples, the lens 30 may be fabricated by exposing a photopolymer resin volume with a three-dimensional light field from multiple angles. The light fields may be updated at each angle. The light fields may be spatially and/or temporarily multiplexed, such that the sum energy dose in the target resin volume may cross-link the resin into a user-defined geometry. A projector can project the three-dimensional light intensity into the liquid resin, which can solidify to become the lens 30 with the cavity 74 without the support feature.

In step 116, in examples having the support feature, the lens 30 with the support feature may be heated. The support feature may be a dissolvable wax or other material having a different solubility than the lens 30. The differing solubility may allow for chemical removal of the support feature. For example, the lens 30 and the support feature may be heated until the support feature dissolves. The lens 30 may remain in a solid state. The lens 30 with the support feature may be heated to a temperature that dissolves the support feature, or alternatively, the lens 30 may be immersed in a heated liquid bath.

In step 120, the dissolved support feature may be removed from the interior 66 of the lens 30 via the apertures 86 defined in the connecting walls 78, 82. Removal of the support feature defines the cavity 74 within the interior 66 of the lens 30. Accordingly, the apertures 86 are in fluid communication with the cavity 74 to allow the support feature to be removed and the cavity 74 to be defined, thereby providing a partially hollow interior 66 for the lens 30.

In step 124, texturing components may be added to the lens 30. For example, grains or other texturing components may be added to various portions of the lens 30. The grains or texturing components can be added to provide a textured effect to the lens 30. The grains may be added through an adjustment in the additive manufacturing process.

In step 128, additional post-processing may be performed to improve the aesthetics of the lens 30. In such examples, sand-blasting, or another similar process, can be performed by blowing sand from one aperture 86 in the connecting wall 78 through the cavity 74 and out the aperture 86 in the opposing connecting wall 82. The post-processing can remove any remaining aspects of the support feature from within the cavity 74 to provide more efficient optical features within the lens 30.

In step 132, the lens 30 may be coupled to the housing 18 to form the lamp assembly 10. In examples where the lamp assembly 10 includes the cover 70, the lens 30 may be coupled to the cover 70. The light source 26 may be disposed within the housing 18. The order of the steps disclosed herein is merely exemplary, such that the method 100 of manufacturing the lamp assembly 10 may be performed in any order and include additional or fewer steps.

Use of the present device may provide for a variety of advantages. For example, the lens 30 may include two different types of optics. Additionally, the lens 30 may include the first optic 50 and the second optic 58, while maintaining a flat or smooth A-surface 38. Also, at least the first optic 50 may be defined within the interior 66 of the lens 30. Further, the second optic 58 may be defined within the interior 66 of the lens 30. Accordingly, both the A-surface 38 and the B-surface 46 of the lens 30 may be substantially flat or smooth. Through the use of an additive manufacturing process, the first optic 50 and the second optic 58 may be defined within the lens 30 adjacent to the cavity 74 defined in the interior 66 of the lens 30. The lens 30 may include the second optic 58 configured to collect and/or collimate the light emitted from the light source 26, and the first optic 50 configured to redistribute and/or direct the collimated light to designated target areas. Additional benefits or advantages of using this device may also be realized and/or achieved.

According to an aspect of the present disclosure, a vehicle lamp assembly includes a housing that defines an opening. A light source is operably coupled with the housing. The light source is configured to emit light. A lens is coupled to the housing proximate the opening. The lens includes a first side that has an A-surface of the lens. A second side has a B-surface of the lens. A first optic defines an interior surface of the first side of the lens. The A-surface is free of the first optic. A second optic is defined on the second side. The first optic and the second optic are aligned to collimate and disperse the light. Embodiments of the present disclosure may include one or a combination of the following features:

a first optic is a pillow lens and a second optic is a Fresnel lens;

a first optic extends across an interior surface of a first side, and a second optic is defined in a discrete portion on a second side;

a lens includes opposing connecting walls extending between a first side and a second side, and each of the opposing connecting walls defines an aperture;

a first side and a second side of the lens define a cavity therebetween;

an interior surface of a first side is a cavity surface, and a first optic is defined in a cavity surface;

a second optic is defined on an inner surface of a second side, and a B-surface is free of a second optic;

an A-surface and a B-surface are flat; and a second optic is defined in a B-surface of the lens.

According to another aspect of the present disclosure, a lamp assembly for a vehicle includes a cover. A lens is coupled to the cover. The lens includes a first surface and a second surface. The first surface and the second surface define an interior of the lens. A first optic is defined within the interior of the lens. A second optic is defined in at least one of the interior of the lens and the second surface. Embodiments of the present disclosure may include one or a combination of the following features:

a first optic is at least one of a pillow lens and a fluted lens, and a second optic is a collimating lens;

a second optic is defined within an interior of a lens, and a second surface is free of a second optic;

a first surface is free of a first optic, and the first surface is an A-surface of a lens;

a second optic is defined within an interior of the lens, and a first surface and a second surface are free of a first optic and the second optic, respectively;

each of a first surface and a second surface are flat;

a second optic is defined in a second surface, and the second surface is a B-surface of a lens;

an interior of a lens is at least partially hollow; and a housing is coupled to said vehicle while a lens is coupled to the housing, and a light source is operably coupled to the housing, and the light source is configured to emit light through a first optic and a second optic.

According to another aspect of the present disclosure, a method for manufacturing a lens for a vehicle lamp assembly includes forming a lens that defines a cavity in an interior thereof. A support feature is added within the cavity of the lens. An optic is printed in the interior of the lens adjacent to the cavity. A support feature is heated. The support feature is removed through apertures defined in the lens. The apertures are in fluid communication with the cavity. Embodiments of the present disclosure may include one or a combination of the following features:

sand-blasting a cavity defined by a lens.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle lamp assembly, comprising:
   a housing defining an opening;
   a light source operably coupled with the housing, wherein the light source is configured to emit light; and
   a lens coupled to the housing proximate the opening, wherein the lens includes:
   a first side having an A-surface of the lens, wherein the A-surface is a light emitting surface;
   a second side having a B-surface of the lens disposed proximate to the light source, wherein the B-surface is one of a light incident surface or a light emitting surface, and wherein an inner cavity is defined within the lens between the first side and the second side;
   a dispersing optic defined on an interior surface of the inner cavity adjacent to the first side of the lens, wherein the dispersing optic is a light incident surface, and wherein the A-surface is free of the dispersing optic; and
   a collimating optic defined on the second side and incorporated into the B-surface of the lens, wherein the dispersing optic and the collimating optic are aligned such that the lens is configured to collimate and then disperse the light emitted by the light source.

2. The vehicle lamp assembly of claim 1, wherein the dispersing optic is a pillow lens and the collimating optic is a Fresnel lens.

3. The vehicle lamp assembly of claim 1, wherein the dispersing optic extends across the interior surface of the first side, and wherein the collimating optic is defined in a discrete portion on the second side.

4. The vehicle lamp assembly of claim 1, wherein the lens includes opposing connecting walls extending between the first side and the second side, and further wherein each of the opposing connecting walls defines an aperture in fluid communication with the inner cavity.

5. The vehicle lamp assembly of claim 1, wherein the inner cavity is proximate to the A-surface.

6. The vehicle lamp assembly of claim 5, wherein an opposing cavity surface relative to the interior surface having the dispersing optic is smooth.

7. The vehicle lamp assembly of claim 1, wherein the A-surface is flat.

8. The vehicle lamp assembly of claim 1, wherein the collimating optic is defined in the B-surface of the lens.

9. A lamp assembly for a vehicle, comprising:
   a cover having an exterior surface; and
   a lens coupled to the cover, wherein the lens includes:
   a first light emitting surface disposed proximate to the exterior surface of the cover, wherein the first light emitting surface is smooth;
   a second opposing light incident surface configured to be disposed adjacent to a light source, wherein the first light emitting surface and the second opposing light incident surface are end surfaces of the lens such that the first light emitting surface and the second opposing light incident surface define an interior of the lens, and wherein an inner cavity is defined within the lens between the first light emitting surface and the second opposing light incident surface;

a dispersing optic defined on an interior of the lens on a cavity surface adjacent to the first light emitting surface, wherein the dispersing optic is a light incident surface; and a collimating optic defined in at least one of the interior of the lens that is configured as a light emitting surface and the second opposing light incident surface, wherein the dispersing optic and the collimating optic are aligned such that the lens is configured to collimate and then disperse the light emitted by the light source.

10. The lamp assembly of claim 9, wherein the dispersing optic is at least one of a pillow lens and a fluted lens.

11. The lamp assembly of claim 9, wherein the collimating optic is defined within the interior of the lens, and wherein the second opposing light incident surface is free of the collimating optic.

12. The lamp assembly of claim 9, wherein the first light emitting surface is free of the dispersing optic, and further wherein the first light emitting surface is an A-surface of the lens.

13. The lamp assembly of claim 9, wherein the collimating optic is defined within the interior of the lens, and wherein the first light emitting surface and the second opposing light incident surface are free of the dispersing optic and the collimating optic, respectively.

14. The lamp assembly of claim 13, wherein each of the first light emitting surface and the second opposing light incident surface are flat.

15. The lamp assembly of claim 9, wherein the collimating optic is defined in the second opposing light incident surface, and wherein the second opposing light incident surface is a B-surface of the lens.

16. The lamp assembly of claim 9, wherein the interior of the lens is at least partially hollow.

17. The lamp assembly of claim 9, further comprising:

a housing coupled to said vehicle, wherein the lens is coupled to the housing, wherein the light source is operably coupled to the housing.

\* \* \* \* \*